US008967923B2

(12) United States Patent
Lerch et al.

(10) Patent No.: US 8,967,923 B2
(45) Date of Patent: Mar. 3, 2015

(54) DUST SUCTION DEVICE FOR DRILLING MACHINE

(75) Inventors: Oliver Lerch, Billigheim-Ingenheim (DE); Roland Vögele, Winnenden (DE)

(73) Assignee: AEG Electric Tools GmbH, Winnenden (DE)

( * ) Notice: Subject to any disclaimer, the term of this patent is extended or adjusted under 35 U.S.C. 154(b) by 385 days.

(21) Appl. No.: 13/349,784

(22) Filed: Jan. 13, 2012
(Under 37 CFR 1.47)

(65) Prior Publication Data

US 2013/0183111 A1 Jul. 18, 2013

(51) Int. Cl.
*B23B 47/34* (2006.01)

(52) U.S. Cl.
CPC .................................... *B23B 47/34* (2013.01)
USPC ........................................... 408/67; 408/110

(58) Field of Classification Search
CPC B23B 2270/62; B23B 47/34; B23Q 11/0046; B23Q 11/006; B23Q 11/0071
USPC ................. 408/67, 72 B, 110, 115 R, 115 B; 175/209, 211; 15/339
See application file for complete search history.

(56) References Cited

U.S. PATENT DOCUMENTS

| | | | |
|---|---|---|---|
| 2,041,689 | A | 5/1936 | Baumeister et al. |
| 2,742,105 | A | 4/1956 | Dow |
| 2,829,867 | A | 4/1958 | Brochetti |
| 3,162,255 | A | 12/1964 | McCarty |
| 3,368,633 | A | 2/1968 | Moates |
| 3,456,740 | A | 7/1969 | Paule et al. |
| 3,533,565 | A | 10/1970 | Weiner |
| 3,537,336 | A | 11/1970 | Schmuck |
| 3,776,647 | A | 12/1973 | Hart |
| 3,837,383 | A | 9/1974 | Ko |
| 3,850,254 | A | 11/1974 | Hirdes |
| 3,882,644 | A | 5/1975 | Cusumano |
| 3,934,661 | A | 1/1976 | Sauerwein et al. |

(Continued)

FOREIGN PATENT DOCUMENTS

| | | |
|---|---|---|
| DE | 2925908 | 1/1981 |
| DE | 3202737 | 8/1983 |

(Continued)

OTHER PUBLICATIONS

English translation of EP2363237, Sep. 2011.*

(Continued)

*Primary Examiner* — Sunil K Singh
*Assistant Examiner* — Alan Snyder
(74) *Attorney, Agent, or Firm* — Michael Best & Friedrich LLP

(57) ABSTRACT

A dust suction device for detachable attachment to a hand-held drilling machine includes a housing, a telescoping suction pipe coupled to the housing, an electric motor positioned in the housing, a suction fan driven by the electric motor and operable to generate a vacuum in the suction pipe, a dust collection container coupled to the housing and positioned upstream of the suction fan, and a support frame. The support frame includes a first portion coupled to the housing, a second portion coupled to a neck of the drilling machine, and an auxiliary handle extending from one of the first and second portions of the support frame. The support frame supports the drilling machine in a side-by-side relationship with the dust suction device.

24 Claims, 3 Drawing Sheets

(56) References Cited

U.S. PATENT DOCUMENTS 3,936,213 A 2/1976 Kappel
3,958,474 A 5/1976 Kreitz
3,964,212 A 6/1976 Karden
4,011,624 A 3/1977 Proett
4,051,880 A 10/1977 Hestily
4,064,952 A 12/1977 Lechner
4,097,176 A 6/1978 Wanner et al.
4,192,390 A 3/1980 Wanner et al.
4,207,953 A 6/1980 Reibetanz et al.
4,209,069 A 6/1980 Smith
4,213,571 A 7/1980 Deardorff et al.
4,250,971 A 2/1981 Reibetanz et al.
4,251,171 A 2/1981 Brett
4,276,675 A 7/1981 Pioch
4,329,095 A 5/1982 Schmuck
4,361,957 A 12/1982 Krotz et al.
4,368,556 A 1/1983 Wanner et al.
4,515,504 A 5/1985 Moore, Sr.
D280,142 S 8/1985 Pudwill
4,766,639 A 8/1988 Lindquist et al.
4,820,090 A 4/1989 Chen
4,820,315 A * 4/1989 DeMarco ........................ 95/268
4,825,140 A 4/1989 St. Louis
4,881,294 A 11/1989 Riedl
D305,607 S 1/1990 Andrews
4,921,375 A 5/1990 Famulari
4,967,516 A 11/1990 Hoshino et al.
D316,316 S 4/1991 Yuen
5,025,870 A 6/1991 Gantner
5,061,123 A 10/1991 Broussard
5,084,972 A 2/1992 Waugh
5,090,499 A 2/1992 Cuneo
5,099,157 A 3/1992 Meyer
5,120,983 A 6/1992 Samann
5,129,467 A 7/1992 Watanabe et al.
5,199,501 A 4/1993 Kluber et al.
5,237,896 A 8/1993 Albright et al.
5,256,906 A 10/1993 Tsuge et al.
5,292,210 A 3/1994 Nowick
5,327,649 A 7/1994 Skinner
5,356,245 A 10/1994 Hosoi et al.
5,440,809 A 8/1995 Padilla
5,467,835 A 11/1995 Obermeier et al.
5,509,454 A 4/1996 Giacometti
5,545,082 A 8/1996 Courson et al.
5,606,767 A 3/1997 Crlenjak et al.
5,688,082 A 11/1997 Richardson
5,747,973 A 5/1998 Robitaille et al.
5,765,654 A 6/1998 Burger
5,813,802 A 9/1998 Ajimi et al.
5,881,823 A 3/1999 Kabatnik et al.
5,899,644 A 5/1999 Buck et al.
5,904,453 A 5/1999 Gavia
5,909,016 A 6/1999 Sterling
5,931,072 A 8/1999 Shibata
5,940,931 A 8/1999 Jeon
5,952,623 A 9/1999 Sterling
5,955,791 A 9/1999 Irlander
5,983,445 A 11/1999 Baker
5,988,954 A 11/1999 Gaskin et al.
5,993,122 A 11/1999 Baker
6,014,811 A 1/2000 Taomo et al.
6,027,399 A 2/2000 Stewart
6,044,519 A 4/2000 Hendrix
6,053,674 A 4/2000 Thompson
6,079,078 A 6/2000 Byington
6,102,631 A 8/2000 Nyari
D431,766 S 10/2000 Zurwelle
6,146,066 A 11/2000 Yelton
6,167,626 B1 1/2001 Doumani et al.
6,222,285 B1 4/2001 Haley et al.
D442,452 S 5/2001 Stirm et al.
6,224,471 B1 5/2001 Clowers et al.
6,233,831 B1 5/2001 Iida et al.
D447,032 S 8/2001 Schoen et al.
6,379,091 B1 4/2002 Queipo
6,416,403 B1 7/2002 Chiang
6,431,040 B1 8/2002 Miller et al.
6,443,675 B1 9/2002 Kopras et al.
6,443,676 B1 9/2002 Kopras
6,457,915 B1 10/2002 Kao
6,470,778 B1 10/2002 Kaye, Jr. et al.
6,501,195 B1 12/2002 Barton
6,502,949 B1 1/2003 Horiyama et al.
6,514,131 B1 2/2003 Reich et al.
6,528,902 B1 3/2003 Barton
6,543,549 B1 4/2003 Riedl et al.
6,557,261 B1 5/2003 Buser et al.
6,587,184 B2 7/2003 Wursch et al.
6,595,300 B2 7/2003 Milbourne
6,609,860 B2 8/2003 Wanek et al.
6,615,930 B2 9/2003 Bongers-Ambrosius et al.
6,641,634 B2 11/2003 Reich et al.
D487,686 S 3/2004 Milbourne
6,749,654 B2 6/2004 Hilliard
6,776,244 B2 8/2004 Milbourne
D499,946 S 12/2004 Stirm
6,827,640 B2 12/2004 Bures et al.
6,829,804 B2 12/2004 Sepke
6,830,507 B2 12/2004 Reich et al.
6,848,985 B2 2/2005 Lamprecht et al.
6,851,898 B2 2/2005 Ege et al.
6,854,937 B1 2/2005 Weiss
6,854,938 B2 2/2005 Kopras et al.
6,887,146 B2 5/2005 Staas et al.
6,910,960 B2 6/2005 Reich et al.
D507,950 S 8/2005 Aglassinger
D508,388 S 8/2005 Aglassinger
6,951,439 B2 10/2005 Arich
D515,383 S 2/2006 Aglassinger
7,000,709 B2 2/2006 Milbourne
7,017,680 B2 3/2006 Arich et al.
D518,347 S 4/2006 Corcoran
D520,320 S 5/2006 Corcoran
7,047,647 B1 5/2006 Muller et al.
7,118,607 B2 10/2006 Bott et al.
7,118,609 B2 10/2006 Valentini
7,123,462 B2 10/2006 Uekawa
7,175,371 B2 2/2007 Vidal
7,182,150 B2 2/2007 Grossman
7,197,826 B2 4/2007 Baxivanelis et al.
7,220,088 B2 5/2007 Ferrari et al.
7,235,006 B2 6/2007 Ikeda et al.
7,281,886 B2 * 10/2007 Stoerig ........................... 408/67
7,296,323 B2 11/2007 Hayama et al.
7,300,337 B1 11/2007 Sun et al.
D559,059 S 1/2008 Concari
7,323,023 B2 1/2008 Michele et al.
7,325,273 B2 2/2008 Thanner et al.
7,334,969 B2 2/2008 Wood et al.
7,341,481 B2 3/2008 Spiri et al.
7,347,651 B2 3/2008 Hintze et al.
7,354,226 B2 4/2008 Britz
7,371,034 B2 5/2008 Clark
7,396,193 B2 7/2008 Kesten
7,422,040 B2 9/2008 Thomas
7,425,109 B2 9/2008 Simm et al.
7,445,655 B2 11/2008 Bock et al.
7,455,486 B2 11/2008 Britz
7,465,328 B2 12/2008 Trautner et al.
7,475,739 B2 1/2009 Wuensch
D587,547 S 3/2009 Aglassinger
7,497,886 B2 3/2009 Walker
7,509,900 B2 3/2009 Young
7,510,356 B2 3/2009 Colon
D590,225 S 4/2009 Sell
7,526,866 B2 5/2009 Schnell et al.
D593,389 S 6/2009 Clayton
D593,827 S 6/2009 Miller et al.
D594,304 S 6/2009 Aglassinger
7,549,826 B2 6/2009 Videtto
7,553,217 B2 6/2009 Reich et al.
7,635,293 B2 12/2009 Sun et al.
7,644,469 B2 1/2010 Beers et al.

(56) References Cited

U.S. PATENT DOCUMENTS

| | | | |
|---|---|---|---|
| 7,661,195 | B1 | 2/2010 | Wood et al. |
| 7,669,622 | B2 | 3/2010 | Liao |
| D615,838 | S | 5/2010 | Aglassinger |
| D618,529 | S | 6/2010 | Stirm |
| D618,531 | S | 6/2010 | Stirm |
| 7,726,918 | B2 | 6/2010 | Onose et al. |
| 7,794,184 | B2 | 9/2010 | Di Nicolantonio et al. |
| 7,799,104 | B2 | 9/2010 | Valentini |
| 7,802,505 | B2 | 9/2010 | Hetcher et al. |
| D625,981 | S | 10/2010 | Stirm |
| 7,821,886 | B2 | 10/2010 | Yuzuki |
| D626,813 | S | 11/2010 | Stirm |
| 7,854,054 | B2 | 12/2010 | Kopras et al. |
| 7,871,311 | B2 | 1/2011 | Wall et al. |
| 7,871,313 | B2 | 1/2011 | Roehm et al. |
| D631,720 | S | 2/2011 | Aglassinger |
| D631,721 | S | 2/2011 | Aglassinger |
| 7,882,771 | B2 | 2/2011 | Sasaki et al. |
| 7,887,624 | B2 | 2/2011 | Ekstrom et al. |
| 7,905,260 | B2 | 3/2011 | Keenan |
| 7,909,114 | B2 | 3/2011 | Nishikawa et al. |
| 7,913,352 | B2 | 3/2011 | Ichikawa et al. |
| 7,938,873 | B2 | 5/2011 | Fritz et al. |
| 7,962,994 | B2 | 6/2011 | Beers |
| 7,976,363 | B2 | 7/2011 | Reich et al. |
| 7,976,364 | B2 | 7/2011 | Roehm |
| 8,015,657 | B2 | 9/2011 | Beers et al. |
| 2001/0052429 | A1 | 12/2001 | Frenzel et al. |
| 2002/0154960 | A1 | 10/2002 | Lin |
| 2003/0044247 | A1 | 3/2003 | Wolfe |
| 2004/0154168 | A1 | 8/2004 | McDonald |
| 2004/0177980 | A1 | 9/2004 | Lucas |
| 2005/0000052 | A1 | 1/2005 | Byles |
| 2005/0037699 | A1 | 2/2005 | Park |
| 2005/0105977 | A1 | 5/2005 | Ishihara |
| 2006/0016043 | A1 | 1/2006 | Matsuhashi et al. |
| 2006/0107634 | A1 | 5/2006 | Ohlendorf |
| 2006/0178087 | A1 | 8/2006 | Wuensch et al. |
| 2006/0276116 | A1 | 12/2006 | Reich et al. |
| 2007/0039119 | A1 | 2/2007 | Zahuranec et al. |
| 2008/0020686 | A1 | 1/2008 | Reich et al. |
| 2008/0022479 | A1 | 1/2008 | Zhao |
| 2008/0124181 | A1 | 5/2008 | Hintze et al. |
| 2008/0189899 | A1 | 8/2008 | Beers et al. |
| 2008/0209739 | A1 | 9/2008 | Saitoh |
| 2008/0276776 | A1 | 11/2008 | Kani et al. |
| 2009/0032138 | A1 | 2/2009 | Alleman et al. |
| 2009/0100682 | A1 | 4/2009 | Delfini et al. |
| 2009/0136309 | A1 | 5/2009 | Coulston et al. |
| 2009/0148246 | A1 | 6/2009 | Nishikawa et al. |
| 2009/0148248 | A1 | 6/2009 | Nishikawa et al. |
| 2009/0158904 | A1 | 6/2009 | Chen |
| 2009/0181606 | A1 | 7/2009 | Loveless et al. |
| 2009/0183336 | A1 | 7/2009 | Kunz et al. |
| 2009/0183614 | A1 | 7/2009 | Auh et al. |
| 2009/0188691 | A1 | 7/2009 | Hahn |
| 2009/0214307 | A1 | 8/2009 | Nguyen |
| 2009/0241283 | A1 | 10/2009 | Loveless et al. |
| 2010/0000386 | A1 | 1/2010 | Dagn |
| 2010/0021252 | A1 | 1/2010 | Leckey |
| 2010/0037571 | A1 | 2/2010 | Roehm |
| 2010/0155095 | A1 | 6/2010 | Furusawa et al. |
| 2010/0170538 | A1 | 7/2010 | Baker et al. |
| 2010/0197209 | A1 | 8/2010 | Dehde et al. |
| 2010/0260565 | A1 | 10/2010 | Santamarina et al. |
| 2010/0269647 | A1 | 10/2010 | Baumann et al. |
| 2010/0316455 | A1 | 12/2010 | Sanchez |
| 2011/0008117 | A1 | 1/2011 | Kasuya et al. |
| 2011/0008118 | A1 | 1/2011 | Yoshikane et al. |
| 2011/0023709 | A1 | 2/2011 | Bosshard |
| 2011/0079207 | A1 | 4/2011 | Guth |
| 2011/0081214 | A1 | 4/2011 | Santamarina et al. |
| 2011/0113587 | A1 | 5/2011 | Nagasaka et al. |
| 2011/0142558 | A1 | 6/2011 | Hahn |
| 2011/0185869 | A1 | 8/2011 | Wasielewski et al. |
| 2011/0226499 | A1 | 9/2011 | Kakiuchi et al. |
| 2011/0266015 | A1 | 11/2011 | Ohlendorf et al. |
| 2011/0266016 | A1 | 11/2011 | Ohlendorf et al. |
| 2011/0283853 | A1 | 11/2011 | Aoyama |
| 2011/0308830 | A1 | 12/2011 | Furusawa et al. |
| 2012/0043101 | A1 | 2/2012 | Ishikawa et al. |

FOREIGN PATENT DOCUMENTS

| | | |
|---|---|---|
| DE | 10342507 | 4/2005 |
| DE | 102004025880 | 11/2005 |
| DE | 102004026038 | 2/2006 |
| DE | 202006017578 | 3/2007 |
| DE | 102006029624 | 1/2008 |
| DE | 102007036783 | 2/2009 |
| EP | 434295 | 6/1991 |
| EP | 426321 | 2/1994 |
| EP | 601805 | 6/1994 |
| EP | 855247 | 7/1998 |
| EP | 958878 | 11/1999 |
| EP | 1245330 | 10/2002 |
| EP | 1281486 | 2/2003 |
| EP | 1293298 | 3/2003 |
| EP | 1459841 | 9/2004 |
| EP | 1459842 | 9/2004 |
| EP | 1477272 | 11/2004 |
| EP | 1477272 A1 * | 11/2004 |
| EP | 1506840 | 2/2005 |
| EP | 1600255 | 11/2005 |
| EP | 1623793 | 2/2006 |
| EP | 1872900 | 1/2008 |
| EP | 2080476 | 7/2009 |
| EP | 2363237 | 9/2011 |
| EP | 2383071 | 11/2011 |
| EP | 2383072 | 11/2011 |
| GB | 1569532 | 6/1980 |
| GB | 2441224 | 12/2008 |

OTHER PUBLICATIONS

Dewalt, D25302DH Dust Extraction System with HEPA Filter, Instruction Manual, (2006), 6 page.

DE 102010010113.3-15 German Search Report dated Oct. 29, 2010, 3 pages.

Dewalt, D25300DH Dust Extraction System (HEPA Filter) for 2 kg L-Shape Hammer, catalog, (2011), 1 page.

Dewalt, D25302DH Dust Extraction System for 36V SDS Rotary Hammer, catalog, (2011), 1 page.

EP 111559340 European Search Report dated Jun. 28, 2011, 6 pages.

* cited by examiner

DUST SUCTION DEVICE FOR DRILLING MACHINE

FIELD OF THE INVENTION

The present invention relates to a dust suction device for detachable attachment to a hand-held drilling machine.

In this context, the term drilling machine includes simple drilling machines as well as percussion drilling machines, rotary hammers, and hammer drills. Preferred are electric drilling machines that can be connected to a power grid or include an on-board power source, for example in the form of a battery or rechargeable battery.

BACKGROUND OF THE INVENTION

Dust suction devices are typically used in tandem with hand-held drilling machines such as rotary hammers to collect dust and other debris during a drilling operation to prevent dust and other debris from accumulating at a worksite. Such dust suction devices may be coupled to a drilling machine to position a suction inlet of the device proximate a drill bit attached to the drilling machine. Such dust suction devices may also include an on-board dust collection container in which dust and other debris is accumulated. Such dust collection containers are often removable from the dust suction device to facilitate disposal of the accumulated dust and debris.

SUMMARY OF THE INVENTION

The invention provides, in one aspect, a dust suction device for detachable attachment to a hand-held drilling machine. The dust suction device includes a housing, a telescoping suction pipe coupled to the housing, an electric motor positioned in the housing, a suction fan driven by the electric motor and operable to generate a vacuum in the suction pipe, a dust collection container coupled to the housing and positioned upstream of the suction fan, and a support frame. The support frame includes a first portion coupled to the housing, a second portion coupled to a neck of the drilling machine, and an auxiliary handle extending from one of the first and second portions of the support frame. The support frame supports the drilling machine in a side-by-side relationship with the dust suction device.

The invention provides, in another aspect, a dust suction device for detachable attachment to a hand-held drilling machine. The dust suction device includes a housing, a telescoping suction pipe coupled to the housing, an electric motor positioned in the housing, a suction fan driven by the electric motor and operable to generate a vacuum in the suction pipe, and a first switch electrically connected between the electric motor and a power source. The first switch is actuated and electrically connects the motor to the power source in response to detecting telescoping movement of the suction pipe. The dust suction device also includes a second switch electrically connected with the electric motor, the power source, and the first switch. The second switch is toggled between a first switching position in which the electric motor remains deactivated irrespective of actuation of the first switch, a second switching position in which the electric motor may be activated and deactivated automatically in response to actuation of the first switch, and a third switching position in which the electric motor may be activated irrespective of actuation of the first switch.

Other features and aspects of the invention will become apparent by consideration of the following detailed description and accompanying drawings.

Figure 1:
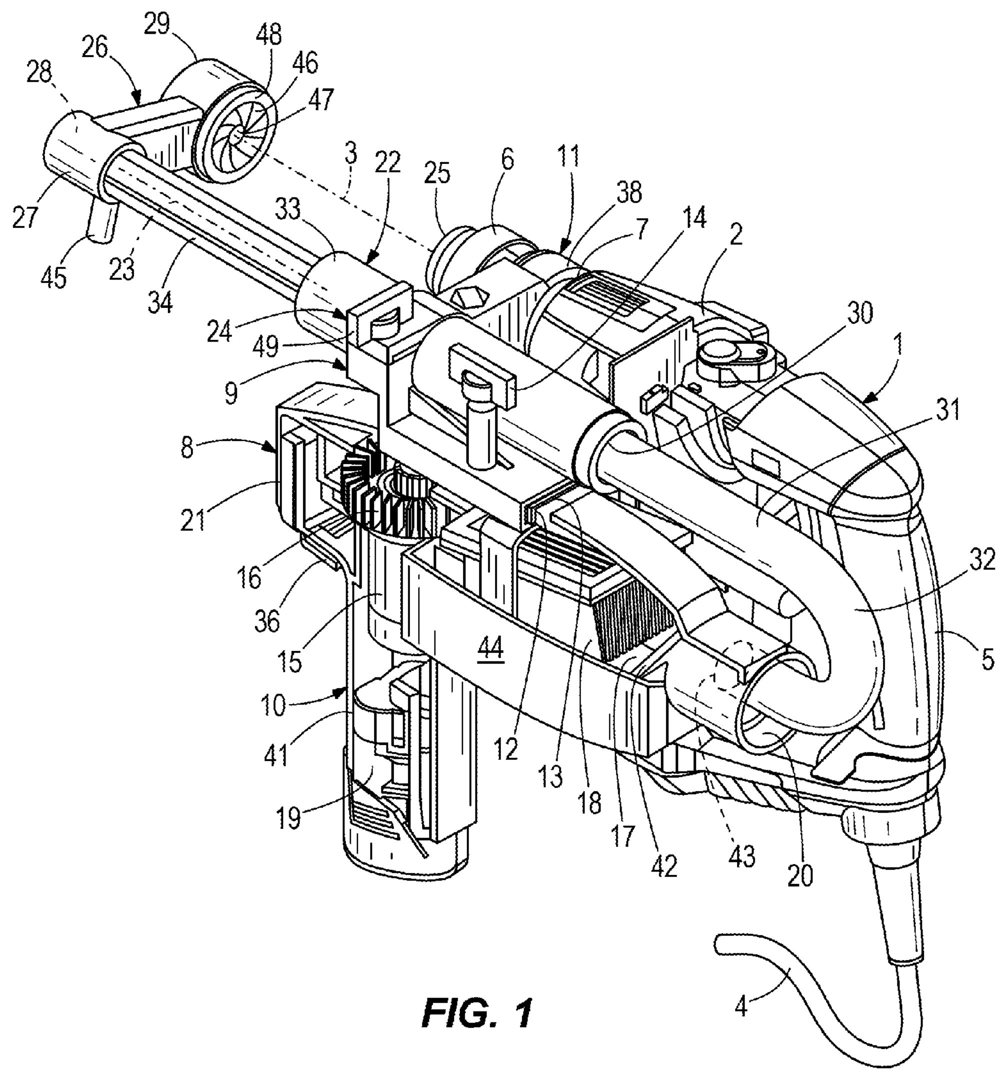
FIG. 1 is a partially cutaway, perspective view of a dust suction device mounted to a drilling machine.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

As shown in FIGS. 1 to 4, a drilling machine 1, which may configured as a percussion drilling machine, a rotary hammer, or a hammer drill, includes a housing 2 in which a spindle (not shown) is drivable in a rotary manner about an axis of rotation 3. For this purpose, the drilling machine 1 includes an electric motor (also not shown), which may be connected to a remote power source via a power cable 4. Instead of the power cable 4, the drilling machine 1 may also be equipped with an on-board power source such as a rechargeable battery or a rechargeable battery pack. Since the drilling machine 1 is thus operated electrically, it is thus an electric drilling machine or generally a power tool or electrically powered appliance.

The drilling machine 1 is also equipped with a handle 5. It may thus be operated by hand and accordingly be designated a hand-held drilling machine 1. Accordingly, the drilling machine 1 may generally be a hand-held power drill or a hand-held power tool or hand-held power machine tool.

In the example shown, the drilling machine 1 and its housing 2 form the familiar L-shape, since the tool's axis of rotation 3 is aligned essentially perpendicularly to the axis of rotation of a rotor of the electric motor for driving the spindle and/or the tool. In contrast to this, in the "pistol configuration" the axis of the electric motor's rotor is aligned essentially parallel to axis of rotation 3 of the tool.

Figure 2:
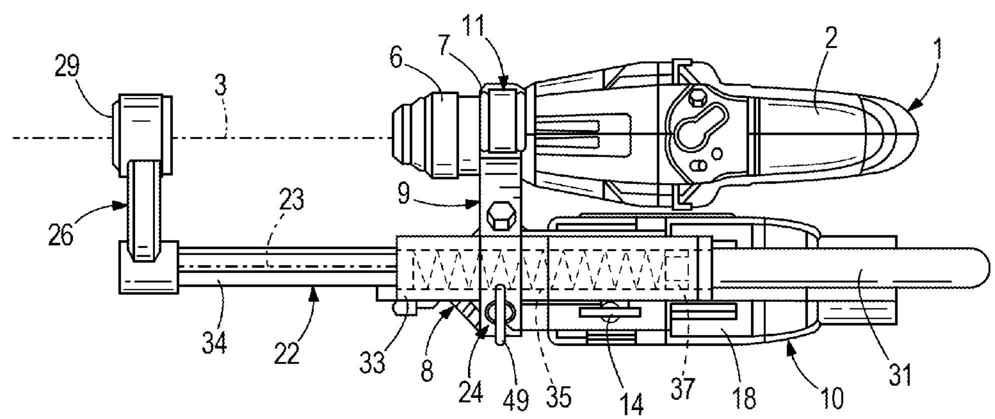
FIG. 2 is a view of the mounted dust suction device from above.
Figure 3:
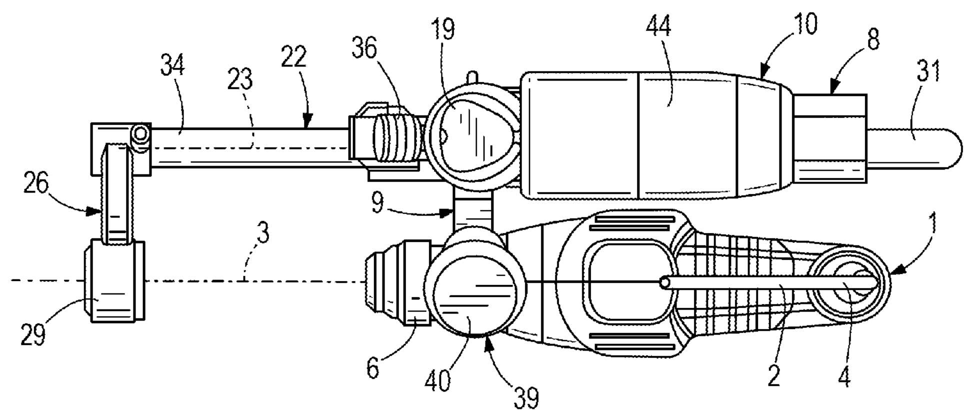
FIG. 3 is a view of the mounted dust suction device from below.
Figure 4:
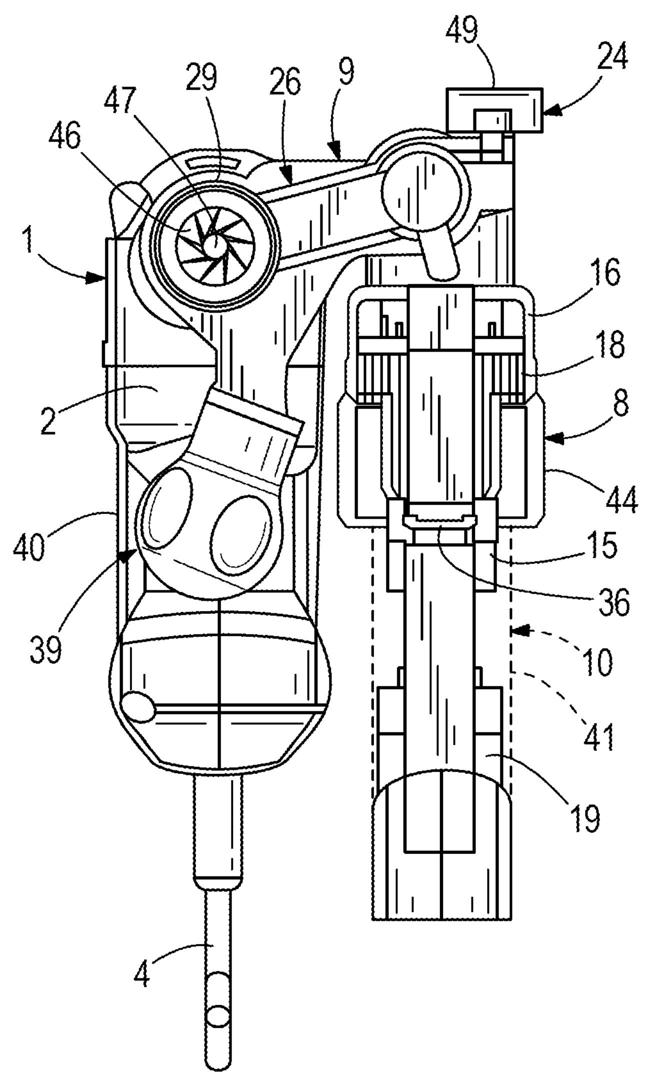
FIG. 4 is a view of the mounted dust suction device from the front.

With reference to FIGS. 1-3, the drilling machine 1 is also equipped with a chuck 6 that is drivable in rotary manner about axis of rotation 3 via the spindle. The chuck 6 serves to hold a tool, particularly a drilling tool, which may be a drill bit, a hammer drill bit, or a masonry drill bit. When the respective tool is in place, it rotates about the axis of rotation 3, which will also be referred to in the following as the axis of rotation of the tool 3. Adjacent to the chuck 6, the housing 2 of drilling machine 1 is furnished with a clamping neck 7 (FIGS. 1 and 2), which usually has a cylindrical shape. On most commercially available drilling machines 1, the cross section of the clamping neck 7 conforms to a standard size, for example 43 mm. The clamping neck 7 is normally used for mounting an additional handle (not shown).

The drilling machine 1 shown in FIGS. 1-4 is equipped with a dust suction device 8. The dust suction device 8 constitutes a separate device from the drilling machine 1, and may be attached detachably to the drilling machine 1. Accordingly, the drilling machine 1 may or may not be equipped with dust suction device 8 depending on the requirement of the application.

In the mounted state shown in FIGS. 1-4, the dust suction device 8 is arranged on one side of the drilling machine 1. With reference to the normal operating position for the drilling machine 1, as reflected in FIGS. 1-4, the dust suction device 8 is arranged to the left of the drilling machine 1. The dust suction device 8 is expediently designed so that it may be mounted to the right of the drilling machine 1 in the same way. The dust suction device 8 is then located entirely to the side of the drilling machine 1, except for a fastening device 11 that will be explained in greater detail below and via which the dust suction device 8 may be fastened to the drilling machine 1. The dust suction device 8 is designed in such a way that it may be mounted beside drilling machine 1, and this in turn means that it may also be used on L-shaped drilling machines 1 as well as pistol-type drilling machines 1 regardless of the size of the respective drilling machine 1.

The dust suction device 8 includes a support frame 9 and a housing 10 that is shown in partial cutaway in FIG. 1. The support frame 9 may be attached to the clamping neck 7 of the drilling machine 1 with the aid of the fastening device 11. The support frame 9 is attached to the clamping neck 7 via the fastening device 11. The notable feature of this arrangement is that the dust suction device 8 is fastened only to the clamping neck 7, and is only in contact with the drilling machine 1 in the area of the clamping neck 7. As a result, the dust suction device 8 may be mounted on the clamping neck 7 in the same way as an auxiliary handle, that is to say instead of an auxiliary handle.

Because clamping necks 7 are usually standardized in terms of shape and size (e.g., having a diameter of about 43 mm), this also makes it possible to mount the dust suction device 8 on a wide range of different standard drilling machines 1. Since there is no other contact between the mounted dust suction device 8 and the drilling machine 1, the dust suction device 8 does not have to be adapted further to fit the respective drilling machine 1 thereby making it considerably easier to use the dust suction device 8 with a range of different drilling machines 1. Consequently, the dust suction device 8 may be used on many different models of drilling machines 1 since the fastening device 11 not only enables attachment to the clamping neck 7, it also enables this attachment without any other connection between the dust suction device 8 and the drilling machine 1, so that no further adaptation has to be made between the drilling machine 1 and the dust suction device 8.

With continued reference to FIG. 1, the housing 10 is attached to the support frame 9. For this purpose, for example, a plug-in connector 12 may be conformed integrally to the housing 10, and a complementary plug-in socket 13 may be provided on the support frame 9. In particular, the plug-in connector 12 may be plugged into the plug-in socket 13 parallel to the axis of rotation of the tool 3. The shape of the connector 12 and socket 13 is selected such that when plugged into the socket 13 the connector 12 is held in place by a positive lock. In this case, a shape according to which the housing 10 is detachably attached to the support frame 9 is particularly advantageous. For example, a retaining screw 14 may be provided to cooperate with the inserted plug-in connector 12 to secure the connector 12 in the socket 13. Thus, the retaining screw 14 may engage in the connector 12 in a positive locking manner or it may brace the inserted connector 12 in the socket 13 in non-positive locking manner.

The connector 12 and socket 13 permit different size housings 10 to be attached to the same support frame 9. Such housings 10 may be constructed differently, particularly with respect to a dust collection chamber 17 (described in further detail below), for different applications. For example, significantly less drilling waste is created when drilling stone or concrete than when drilling wood or similar materials. Drilling wood typically creates large amounts of waste, so that a considerably larger dust collection chamber is beneficial.

With continued reference to FIG. 1, an electric motor 15 and a suction fan 16 are disposed in the housing 10. The electric motor 15 drives the suction fan 16. The housing 10 also contains a dust collection chamber 17. The housing 10 further accommodates a dust filter 18. The housing 10 also has a power source 19 for supplying the electric motor 15 with electrical energy. The power source 19 may be in the form of a battery, but preferably a rechargeable battery or rechargeable battery pack.

The housing 10 is also furnished with an air inlet 20 and an air outlet 21, which may have the form of a plurality of slots positioned radially adjacent to the suction fan 16. The dust filter 18 is arranged upstream of the suction fan 16 in a flow path leading from the air inlet 20 to the air outlet 21. In this way, the fan 16 is protected from being hit by dirt particles and other debris. Accordingly, the dust collection chamber 17 is also located upstream of the fan 16 and upstream of the dust filter 18.

With continued reference to FIG. 1, a straight suction pipe 22 is fastened to the support frame 9 in such manner that it is axially adjustable on the support frame 9. The axial direction of the suction pipe 22 is defined by its longitudinal centreline 23, which extends parallel to the axis of rotation of the tool 3 when the dust suction device 8 is mounted. As the suction pipe 22 is axially adjustable, it is possible to adjust the dust suction device 8 to match the different lengths of the tools inserted in the chuck 6. Once its position has been adjusted relative to the support frame 9, the suction pipe 22 may be locked in position via a locking device 24. The locking device 24 may include for example a clip 25 that extends over the suction pipe 22 and a retaining screw 49 for clamping the suction pipe 22 to the support frame 9.

With reference to FIGS. 1-4, a suction channel 26 is attached to the suction pipe 22 distally with respect to the support frame 9. A first end 27 of the suction channel 26 is coupled to an inlet end 28 of the suction pipe 22 and is in fluid communication therewith. At the other end, the suction channel 26 is furnished with a suction opening 29 facing away from the drilling machine 1. When the dust suction device 8 is mounted, the suction opening 29 is aligned coaxially with the axis of rotation of the tool 3. The suction opening 29 may have a circular cross section.

The outlet end 30 of the suction pipe 22 is connected to an at least partly flexible tube 31, which in turn is connected to the inlet opening 20 of the housing 10. The tube 31 is constructed flexibly with at least one U-shaped curved section 32. It is practical to construct the tube 31 so that the entire length thereof is flexible, that is to say from outlet end 30 to the air inlet 20. The tube 31 is attached detachably to the suction pipe 22. Alternatively, the tube 31 may be attached detachably to the housing 10. It is also possible to attach the tube 31 detachably to both the suction pipe 22 and the housing 10. In conjunction with the housing 10 that is attached detachably to the support frame 9, the detachable tube 31 enables easy mounting and removal of the housing 10 from the support frame 9. The flexibility of the tube 31 enables easy adaptation of the connection between the suction pipe 22 and the inlet opening 20 when the suction pipe 22 is adjusted lengthwise.

With reference to FIG. 1, the suction pipe 22 is advantageously of telescoping construction. For this purpose, the suction pipe 22 includes an outer pipe 33 arranged on the support frame 9 and an inner pipe 34 arranged coaxially therewith and positioned inside the outer pipe 33 so as to be slidable in a telescoping manner. The inner pipe 34 carries the suction channel 26. The outer pipe 33 is attached to the support frame 9 so as to be axially adjustable and connected to tube 31. The outer pipe 33 thus enables the suction pipe 22 to be adjusted axially so that the dust suction device 8 may be adapted to the differing lengths of the drilling tool with which it is used, for example a drill bit, a masonry drill bit, or a hammer drill bit. The telescoping capability of the suction pipe 22 enables the dust suction device 8 to be adjusted automatically and steplessly to the drilling depth while the drilling machine 1 is being operated. As the depth of the hole created with the drilling tool increases, so the inner pipe 34 extends deeper into the outer pipe 33.

In order to provide a dust-tight fluid coupling between the inner pipe 34 and the outer pipe 33, a corrugated or expandable tube (not shown) may be provided that folds together like an accordion when the inner pipe 34 advances into the outer pipe 33, and unfolds in the manner of an accordion when the inner pipe 34 is withdrawn from the outer pipe 33.

As shown in FIG. 2, the inner pipe 34 may be braced axially against the outer pipe 33 via a compression spring 35. In this way, the inner pipe 34 is pre-tensioned outwardly. As a consequence, the suction channel 26 is pre-tensioned when the suction opening 29 thereof comes into contact with the obstruction to be drilled. The compression spring 35 may particularly be integrated in the corrugated tube described above.

In order to be able to switch on the dust suction device 8 manually, it may be equipped with a button switch 36 (FIGS. 1 and 3) that is operable manually, for example by rotating, pressing or sliding, and which is attached to housing 10. In addition or alternatively, as shown in FIG. 2, a pressure switch 37 may be provided that switches on the dust suction device 8 automatically when the suction channel 26 is pressed against an obstruction or a workpiece that is to be drilled. Actuation of the respective switches 36 or 37 energizes the electric motor 15 and thus causes the fan 16 to activate. In the illustrated construction of the dust suction device 8, the pressure switch 37 is arranged axially between the compression spring 35 and the outer pipe 33. However, the pressure switch 37 might also be arranged axially between the compression spring 35 and the inner pipe 34, for example.

In the illustrated construction of the dust suction device 8, at least three switching positions are assigned to the button switch 36. In a first switching position, the electric motor 15 and fan 16 may be manually switched off or deactivated irrespective of actuation of the pressure switch 37, so that the fan 16 cannot be activated by operating the pressure switch 37. In a second switching position, the pressure switch 37 is activated so that the fan 16 may be switched on and off by the operating pressure switch 37. In other words, in the second switching position, the electric motor 15 and fan 16 may be activated and deactivated automatically in response to actuation of the pressure switch 37. In a third switching position, the electric motor 15 and fan 16 may be switched on or activated manually regardless of the pressure switch 37 being operated. In other words, in the third switching position, the electric motor 15 may be activated manually irrespective of actuation of the pressure switch 37. Therefore, when the button switch 36 is toggled to the third switching position, the dust suction device 8 may be used as a stand-alone suction or vacuum device when it is detached from the drilling machine 1.

With reference to FIG. 1, the fastening device 11, which is used to secure the dust suction device 8 to the drilling machine 1, has a band clamp 38. The band clamp 38 encircles the clamping neck 7 coaxially with the axis of rotation of the tool 3 to enable the dust suction device 8 to be mounted on the drilling machine 1. The fastening device 11 is also furnished with a clamping device 39 (FIG. 3), that enables the band clamp 38 to be tightened when it is in place around the clamping neck 7. Tightening the clamp band 38 then creates a non-positive locking engagement securing the support frame 9 on the clamping neck 7. The clamping device 39 may be equipped with a manually operable toggle lever 40 that may be used to tighten the band clamp 38. The toggle lever 40 is designed as an additional or auxiliary handle, as is shown particularly clearly in FIG. 4.

The fastening device 11 may be designed for a specific cross section of the clamping neck 7, for example for a standard circular cross section with a 43 mm diameter.

In the illustrated construction of the dust suction device 8, the housing 10 is also furnished with a housing section 41 that is constructed in the form of an additional handle (FIG. 1). This housing section 41 contains the electric motor 15 and the power source 19. The dust suction device 8 described here may thus particularly advantageously offer two additional handles for the drilling machine 1, that is to say the toggle lever 40 and the housing section 41, which helps considerably to ease the operation of the drilling machine 1. The housing section 41 extends essentially perpendicularly to the longitudinal centreline 23 of the suction pipe 22.

The dust filter 18 may be designed as a fine dust filter. Such a fine dust filter, which may also be referred to as a HEPA filter (High Efficiency Particulate Absorber), is able to trap at least 99.9% of the particles that are typically generated during drilling. In this way, not only is the fan 16 protected from being hit by larger particles but fine dust is also prevented from contaminating the area surrounding the drilling machine 1, thereby reducing the hazard to the health of the operator using it. The dust filter 18 may include a standard filter medium such as a fleece material or a paper material.

In order to prevent the dust filter 18 from being damaged by the impact of larger particles as well, an impactor 42 (FIG. 1) may be arranged in the flow path and upstream of the dust filter 18 in the housing 10. The impactor 42 forms a collision plate that is arranged in the flight path of the airborne particles, in the area of the air outlet 20 and downstream of an outlet end 43 of the tube 31. The impactor 42 causes a powerful flow diversion of the arriving suction stream, causing it initially to be directed away from the dust filter 18. The impactor 42 diverts the arriving stream into the dust collection chamber 17. Once there, the stream must then be redirected again so that it reaches the suction side of the fan 16 through the dust filter 18. In this way, it is possible to prevent the dust filter 18 from being bombarded directly by the particles carried along in the airflow. At the same time, the airborne particles are subjected to a powerful decelerating force, thus enabling them to accumulate more easily in the dust collection chamber 17.

The dust collection chamber 17 is defined at least partially by a collection container 44 (FIG. 1). The collection container 44 is a separate component from the housing 10 and is attached detachably to the housing 10. Together, the housing 10 and the collection container 44 define the dust collection chamber 17. Because the collection container 44 is detachable, the dust collection chamber 17 may be emptied very easily. Moreover, different collection containers 44 may be selected for attachment to the housing 10. For example, the comparatively small collection container 44 shown is suitable for collecting rock waste material that is created when drilling in concrete or rock. However, if the drilling machine 1 is to be used for drilling wood, a considerably larger dust collection chamber 17 is required and a correspondingly larger collection container or collecting pouch or bag may accordingly be attached to the housing 10.

It is particularly advantageous to make the collection container 44 from a relatively hard and/or rigid plastic, which is practically designed so that the collection container 44 is not noticeably deformed due to the vacuum generated in the dust collection chamber 17 when the dust suction device 8 is being operated.

The housing 10 may also be made such that it is at least partly transparent to visible light at least in the area of the dust collection chamber 17. For example, the housing 10 may be furnished with a transparent window in the area of the dust collection chamber 17 to view the accumulated height of the dust and other debris within the chamber 17. If, as here, a collection container 44 is used the container 44 may be made to be entirely transparent for the same purpose. The collection container 44 may equally contain at least one transparent window, and the rest of the container 44 may be non-transparent or opaque. The housing 10 is advantageously made from a plastic for this purpose. If the housing 10 and/or collection container 44 includes transparent and non-transparent areas, the housing 10 and the collection container 44 may be manufactured using different plastics.

Unlike the housing 10, the support frame 9 is advantageously made from metal, a lightweight metal or lightweight metal alloy being preferred. Aluminium or an aluminium alloy is particularly suitable for the purpose.

If the power source 19 is configured as a rechargeable battery or rechargeable battery pack, as here, it may be fitted detachably to the handle-shaped section 41 in the housing 10. In this way, it is possible for example to charge the power source 19 using a separate charger. This also makes it possible to use several power sources 19 in an alternating manner.

The suction channel 26 may be disposed on the suction pipe 22 so as to be rotatable about the longitudinal centerline 23 of the suction pipe 22. A locking device 45 (FIG. 1) may be provided between the suction channel 26 and the suction pipe 22 to lock the suction channel 26 in a given rotated position. The locking device 45 may be, for example, a setscrew for locking the sleeve-like end 27 relative to the suction pipe 22, or the inner pipe 34 thereof, to assure a non-positive lock at the desired rotated position.

The suction channel 26 may have a screen 46 on a side facing away from the suction opening 29, which is facing towards the viewer in FIG. 1. The screen 46 has a screen aperture 47, the size of which is adjustable, through which a tool bit is received. When the dust suction device 8 is mounted on the drilling machine 1, the screen aperture 47 is positioned coaxially with the axis of rotation of the tool 3. The respective drilling tool passes through screen opening 47 as far as the suction opening 29. Because the screen aperture 47 is adjustable, the suction channel 26 may be adapted to accommodate the various diameters of the drilling tools used. For example, the screen 46 is equipped with an adjusting ring 48 that may be used to adjust the opening size of the screen aperture 47. The adjusting ring 48 may be turned manually to change the opening size of the screen aperture 47.

The suction channel 26 has a predefined length that is synchronised with the distance between the axis of rotation of the tool 3 and the centerline axis of the suction pipe 22, which is adjusted when the dust suction device 8 is mounted on a drilling machine 1 having a standard clamping neck 7 cross section to which the dust suction device 8 is adapted. To enable other cross sections of the clamping neck 7 as well, in another embodiment of the dust suction device 8, the suction channel 26 may also be designed so that its length is adjustable.

The dust suction device 8 is designed such that it may be operated using an on-board power source and mounted on the drilling machine 1 in such way that when mounted it is positioned next to the drilling machine 1 in a typical working position of the drilling machine 1, and spaced apart from the drilling machine 1 by the fastening device 11 such that the dust suction device 8 does not otherwise touch or contact the drilling machine 1.

Various features of the invention are set forth in the following claims.

What is claimed is:

1. A dust suction device for detachable attachment to a hand-held drilling machine, the dust suction device comprising:
- a housing;
- a telescoping suction pipe coupled to the housing;
- an electric motor positioned in the housing;
- a suction fan driven by the electric motor and operable to generate a vacuum in the suction pipe;
- a dust collection container coupled to the housing and positioned upstream of the suction fan;
- a pressure switch for activating the electric motor and suction fan automatically when the suction pipe is pressed against a workpiece; and
- a support frame including
  - a first portion coupled to the housing,
  - a second portion coupled to a neck of the drilling machine, and
  - an auxiliary handle extending from one of the first and second portions of the support frame, the support frame supporting the drilling machine in a side-by-side relationship with the dust suction device.

2. The dust suction device of claim 1, wherein the second portion of the support frame includes a band clamp encircling the neck of the drilling machine.

3. The dust suction device of claim 2, wherein the band clamp includes a clamping device for tightening the band clamp on the neck of the drilling machine, and wherein the clamping device includes the auxiliary handle.

4. The dust suction device of claim 1, further comprising a dust filter positioned between the suction fan and the dust collection container.

5. The dust suction device of claim 4, wherein the dust filter is at least partially positioned within the dust collection container.

6. The dust suction device of claim 4, wherein the dust filter is configured as a HEPA dust filter.

7. The dust suction device of claim 1, further comprising a suction channel, a first end of which is connected to an inlet end of the suction pipe, and a second end of which has a suction opening that is aligned coaxially with an axis of rotation of a rotatable tool driven by the drilling machine when the dust suction device is mounted to the hand-held drilling machine.

8. The dust suction device of claim 7, wherein the suction channel is rotatable about a longitudinal axis of the suction pipe for repositioning the suction opening depending upon which side of the drilling machine the dust suction device is mounted.

9. The dust suction device of claim 7, wherein the suction pipe includes an outer pipe and an inner pipe arranged coaxially therein, wherein the inner pipe is movable telescopically within the outer pipe.

10. The dust suction device of claim 9, wherein the suction channel is coupled for telescoping movement with the inner pipe.

11. The dust suction device of claim 9, further comprising an expandable tube positioned within the inner and outer pipes through which the vacuum generated by the suction fan is drawn.

12. The dust suction device of claim 11, wherein the inner pipe is biased axially outwardly from the outer pipe by a compression spring, and wherein the compression spring is integrated with the expandable tube.

13. The dust suction device of claim 1, wherein the first portion of the support frame is detachably coupled to the housing.

14. The dust suction device of claim 1, further comprising a button switch for manually activating and deactivating the electric motor and suction fan.

15. The dust suction device of claim 14, wherein the button switch has at least three switching positions, including a first switching position in which the electric motor remains deactivated irrespective of actuation of the pressure switch, a second switching position in which the electric motor may be activated and deactivated automatically in response to actuation of the pressure switch, and a third switching position in which the electric motor may be activated irrespective of actuation of the pressure switch.

16. The dust suction device of claim 1, further comprising at least one of a rechargeable battery and a rechargeable battery pack for supplying the electric motor with electrical energy.

17. The dust suction device of claim 1, wherein the dust collection container is at least partly transparent for visible light.

18. A dust suction device for detachable attachment to a hand-held drilling machine, the dust suction device comprising:

a housing;

a telescoping suction pipe coupled to the housing;

an electric motor positioned in the housing;

a suction fan driven by the electric motor and operable to generate a vacuum in the suction pipe;

a first switch electrically connected between the electric motor and a power source, the first switch being actuated and electrically connecting the motor to the power source in response to detecting telescoping movement of the suction pipe; and a second switch electrically connected with the electric motor, the power source, and the first switch, the second switch being toggled between a first switching position in which the electric motor remains deactivated irrespective of actuation of the first switch, a second switching position in which the electric motor may be activated and deactivated automatically in response to actuation of the first switch, and a third switching position in which the electric motor may be activated irrespective of actuation of the first switch.

19. The dust suction device of claim 18, further comprising a dust collection container coupled to the housing and positioned upstream of the suction fan.

20. The dust suction device of claim 19, further comprising a dust filter positioned between the suction fan and the dust collection container.

21. The dust suction device of claim 19, wherein the dust collection container is at least partly transparent for visible light.

22. The dust suction device of claim 18, further comprising a support frame including a first portion coupled to the housing;

a second portion coupled to a neck of the drilling machine; and an auxiliary handle extending from one of the first and second portions of the support frame, the support frame supporting the drilling machine in a side-by-side relationship with the dust suction device.

23. The dust suction device of claim 22, wherein the second portion of the support frame includes a band clamp encircling the neck of the drilling machine.

24. The dust suction device of claim 23, wherein the band clamp includes a clamping device for tightening the band clamp on the neck of the drilling machine, and wherein the clamping device includes the auxiliary handle.

* * * * *